US012605596B2

(12) United States Patent
Savage et al.

(10) Patent No.: US 12,605,596 B2
(45) Date of Patent: Apr. 21, 2026

---

(54) VALVE SYSTEM

(71) Applicant: GRAYS OF CAMBRIDGE (INTERNATIONAL) LTD, East Sussex (GB)

(72) Inventors: Ian Savage, Lincolnshire (GB); Paul Jenkins, East Sussex (GB); Peter Husemeyer, Tunbridge Wells (GB); Mickael Churet, London (GB); Ryan Godolphin, Brentford (GB)

(73) Assignee: GRAYS OF CAMBRIDGE (INTERNATIONAL) LTD., East Sussex (GB)

( * ) Notice: Subject to any disclaimer, the term of this patent is extended or adjusted under 35 U.S.C. 154(b) by 222 days.

(21) Appl. No.: 17/771,425

(22) PCT Filed: Oct. 23, 2020

(86) PCT No.: PCT/GB2020/052703
§ 371 (c)(1),
(2) Date: Apr. 22, 2022

(87) PCT Pub. No.: WO2021/079155
PCT Pub. Date: Apr. 29, 2021

(65) Prior Publication Data
US 2022/0409963 A1 Dec. 29, 2022

(30) Foreign Application Priority Data
Oct. 25, 2019 (GB) ...................................... 1915533

(51) Int. Cl.
A63B 43/00 (2006.01)
A63B 24/00 (2006.01)
(Continued)

(52) U.S. Cl.
CPC ........ A63B 43/004 (2013.01); A63B 24/0021 (2013.01); A63B 41/04 (2013.01);
(Continued)

(58) Field of Classification Search
CPC ... A63B 43/004; A63B 24/0021; A63B 41/04; A63B 41/08; A63B 2024/0034; A63B 2225/50; A63B 2243/0066; F16K 24/06
See application file for complete search history.

(56) References Cited

U.S. PATENT DOCUMENTS 1,981,720 A * 11/1934 Crane ..................... F16K 15/20
473/610
2,080,894 A * 5/1937 Levinson ............... A63B 41/04
473/603
(Continued)

FOREIGN PATENT DOCUMENTS

CN 207406854 U * 5/2018 ............. B60C 29/04
CN 208 287 425 12/2018
GB 2557373 A * 6/2018 ........... F16K 15/147

OTHER PUBLICATIONS

"Dictionary definition: Profile", <https://www.google.com/search?q=profile+definition&sca_esv=0768fee8cae7caeb&source=hp&ei=3u5FZ6m6C6LiiLMPsL6H8Qc&iflsig=AL9hbdgAAAA-AZ0X87su8WyvNAotVoGQlaL1cgbjAjrE&ved=0ahUKEwipodfArfqJAxUiMWIAHTDflX4Q4dUDCA8&uact=5&oq=profile+definition&gs_lp=Egdnd3Mtd216IhJwcm9maW(Year: 2024) xllGRIZmluaXRpb24yChAAGIAEGEYY-QEyBRAAGIAEMgUQABiABDIFEAAYgAQyBRAAGIAEMgUQABiABDIFEAAYgAQyBRAAGIAEMgUQABiABDIFEAAYgARIvjRQgRtYrjJwAngAkAEDmAGYAqAB3BCqAQYxMy40LjO4AQPIAQD4AQGYAhOgAu4LqAIKwglKEAAYAxjqAhiPAclCChAuGAMY6glYjwHCAg4QLhiABBixAxjHARivAcICCBAAGIAEGLEDwgIUEC4YgAQYsQMYgwEY1AIYxwEYrwHCAgsQABiABBixAxiDAclCCxAuGAIAEGLEDGIMBwgIOEAAYgAQYsQMYgwEYigXCAhEQLhiABBixAxjRAxiDARjHAclCCxAuGAIAEGNEDGMcBwgIIEC4YgAQYsQPCAg4QLhiABBixAxjRAxjHAcICCxAuGIAEGMcBGK8BwgIOEC4YgAQYsQMYgwEY5QTCAgUQLhiABMICCBAuGIAEGOUEmAMLkgcEMTUuNKAH9tlB&sclient=gws-wiz>, retrieved on Nov. 25, 2024.*

(Continued)

*Primary Examiner* — Steven B Wong
(74) *Attorney, Agent, or Firm* — Snell & Wilmer LLP

(57) ABSTRACT

An apparatus for insertion into an inflatable sports ball, the apparatus comprising a plate comprising a valve wherein the
(Continued)

valve comprises an aperture for selective communication of air, a circuit board comprising a transmitter and a battery electrically connected to the circuit board.

21 Claims, 14 Drawing Sheets

(51) Int. Cl.
| | | |
|---|---|---|
| *A63B 41/04* | (2006.01) | |
| *A63B 41/08* | (2006.01) | |
| *F16K 24/06* | (2006.01) | |

(52) U.S. Cl.
CPC .............. *A63B 41/08* (2013.01); *F16K 24/06* (2013.01); *A63B 2024/0034* (2013.01); *A63B 2225/50* (2013.01); *A63B 2243/0066* (2013.01)

(56) References Cited

U.S. PATENT DOCUMENTS

| | | | | |
|---|---|---|---|---|
| 2,118,325 | A * | 5/1938 | Peters | F16K 15/202 473/599 |
| 2,349,463 | A * | 5/1944 | Riddell | F16K 15/202 473/611 |
| 2,387,455 | A * | 10/1945 | McDermott | F16K 15/202 473/611 |
| 2,600,862 | A * | 6/1952 | Fenton | F16K 15/202 473/610 |
| 4,274,633 | A * | 6/1981 | Benscher | A63B 41/04 473/610 |
| 4,320,776 | A * | 3/1982 | Yang | A63B 41/04 473/610 |
| 4,568,081 | A * | 2/1986 | Martin | F16K 15/202 473/611 |
| 8,540,595 | B1 * | 9/2013 | Lin | F16K 15/202 473/610 |
| 9,908,008 | B2 * | 3/2018 | Fang | A63B 43/06 |
| 10,076,685 | B2 * | 9/2018 | King | H02J 50/90 |
| 2003/0144096 | A1 * | 7/2003 | Lee | A63B 41/04 473/611 |
| 2008/0132363 | A1 * | 6/2008 | Harada | A63B 43/06 473/570 |
| 2010/0130314 | A1 | 5/2010 | Von Der Gruen et al. | |
| 2011/0136604 | A1 * | 6/2011 | Hsu | A63B 41/00 473/609 |
| 2012/0058845 | A1 * | 3/2012 | Crowley | A63B 41/00 206/522 |
| 2015/0157900 | A1 * | 6/2015 | Holthouse | A63B 41/04 473/570 |
| 2017/0106250 | A1 * | 4/2017 | Bloom | A63B 41/12 |
| 2017/0368425 | A1 * | 12/2017 | Gordon | A63B 71/0605 |
| 2019/0309864 | A1 * | 10/2019 | Bouteiller | F16K 15/147 |
| 2020/0391084 | A1 * | 12/2020 | Ianni | A63B 41/02 |
| 2022/0296968 | A1 * | 9/2022 | Hall | A63B 41/04 |

OTHER PUBLICATIONS

International Search Report and Written Opinion (mailing date Jan. 18, 2021) for Corresponding International PCT Patent Application No. PCT/GB2020/052703, filed, Oct. 23, 2020.

* cited by examiner

VALVE SYSTEM

FIELD AND BACKGROUND

The present invention relates particularly, but not exclusively, to an apparatus comprising a circuit board with a transmitting system for use in an inflatable sports ball. More particularly, the present invention relates to an apparatus comprising a transmitting system for a rugby ball.

There is a desire to be able to track sports balls, for example rugby balls, whilst they are in use either in training or in a match. This would be able to provide a number of important and interesting statistics for players and coaches. From a performance perspective, if players and coaches could track and understand how different training and techniques affect how the ball can be passed/kicked, it could provide a valuable insight into the best training methods, and give feedback on player technique, which in turn can lead to improvement in players' skills.

During matches, having knowledge of exactly where the ball is would be integral in developing a real-time virtual display of the ball during a game. This would give rise to being able to write programs to allow a match to be created in a virtual world which could be used for player/coach feedback or for TV analysis during broadcast. This data could also be used to recreate all/part of the game if the movement of the players was also tracked.

Attempts have been made to successfully track the movement of balls during sports games but they have failed to provide sufficient accuracy and data to allow a game to be recreated, monitored or modelled for instantaneous analysis or post game review. Furthermore, previous attempts have been detrimental to the normal characteristics, for example flight characteristics, of a ball.

The inventors have identified an alternative way in which to allow the ball to be tracked and a game to be monitored. The apparatus of the present invention comprises a unique transmitter apparatus which is able to transmit a signal to a receiver without affecting the characteristics of a ball. The system when installed inside a sports ball thus provides a novel and accurate way of tracking the sports ball by transmitting its location to a number of receivers.

The apparatus comprising the transmitting system of the present invention is able to overcome the problems seen when using GPS systems since the use of the transmitter enables the location of the ball to be monitored to a high level of accuracy. Furthermore, GPS systems have reduced consistency for example when used in indoor environments which is not seen with the device of the present invention.

It will be recognised from the disclosure herein that the invention is also suitable for use in other inflatable balls where it is desired to be able to accurately track movement of the ball.

SUMMARY

Particular aspects and embodiments are set out in the appended claims.

Viewed from a first aspect, there is provided an apparatus for insertion into an inflatable sports ball. The apparatus comprises a plate comprising a valve, wherein the valve comprises an aperture for selective communication of air, a circuit board comprising a transmitter and a battery electrically connected to the circuit board.

The apparatus enables the movement of the inflatable sports ball to be accurately tracked through transmissions of signals from the transmitter to receivers. The transmitter may in some examples not be part of the circuit board but be a separate electrical component.

The plate may comprise a curved profile for contacting with an inner surface of the inflatable sports ball. Thus, when the plate is installed in the ball and the ball is inflated, the edges of the plate do not extrude from the curved surface of the ball.

The plate may additionally comprise a first elongate groove formed in the curved profile for housing the valve. Thus the weight of the apparatus is reduced.

The plate may additionally comprise a second elongate groove perpendicular to the first elongate groove. Thus the weight of the apparatus is reduced.

The plate may additionally comprise an oval shaped groove coaxial with the valve and formed in the curved profile of the plate. Thus the weight of the apparatus is reduced. Furthermore, the oval shaped groove increases the flexibility of the plate. Thus, when the apparatus is installed in an inflatable ball, the rigidity of the plate is reduced.

The plate may additionally comprise an electrical connection port for data transmissions and/or the inlet of electric power for charging the battery. Thus, software updates can be made to the circuit board. Furthermore, the battery can be charged. Thus, the apparatus can be recharged and used multiple times.

The transmitter may be ultra-wideband (UWB). UWB provides greater accuracy than other forms of transmission. Additionally, UWB maintains a high level of accuracy in a number of different environments. For example, it allows signals to be transmitted accurately indoors. Furthermore, signals can be transmitted over long distances with low energy usage thus reducing the need to regularly charge the battery.

The transmitter may be configured to send signals to receivers. When the apparatus is installed in a ball and the ball is in use, receivers may be located around the stadium in which the ball is being used. In this way, the location, speed and direction of travel of the ball may be tracked.

Viewed from a second aspect, there is provided a rugby ball having a substantially ovoid shape. The rugby ball comprises an inner inflatable bladder configured to be inflated through a valve aperture, an outer cover configured to encase the inner inflatable bladder when inflated and the apparatus as previously defined attached to the outer cover. A portion of the apparatus extends into the interior of the inner inflatable bladder and wherein the valve aperture is in fluid communication with the inner inflatable bladder.

The rugby ball may comprise two ends located along a longitudinal axis of the ball. The apparatus may be attached to the outer cover substantially halfway between the two ends of the ovoid rugby ball. Thus, the location of the weighted valve half way along the ball improves the flight of the ball.

The outer cover may comprise a plurality of panels connected together by seams, wherein the apparatus is fixably attached to the outer cover at a seam between two adjacent panels.

The rugby ball may additionally comprise a weight balancing arrangement. Any additional and uneven weight in sports balls may cause problems with the way in which the ball travels. For example, with a rugby ball, it is desirable that the ball rotates along its longitudinal axis as it flies through the air. This can be achieved with a ball with a particular weight offset, i.e. a greater weight on one side of the ball than the other. However, if the weight offset between the two sides of the ball exceeds a certain threshold, the rotation consistency can be compromised. This will lead to an uneven and unexpected flight path. The apparatus of the present invention adds additional weight to a rugby ball compared to a conventional valve due to the circuit board and the battery which provides power to the circuit board. The weight balancing arrangement on the rugby ball of the present invention therefore is in place to balance the weight added by the apparatus of the present invention. This weight balancing system thus prevents inconsistencies in rotation of the ball. The rugby ball of the invention therefore provides a way in which to track a rugby ball without affecting the ball's current playability.

The weight balancing arrangement may comprise at least one counterweight located on a side of the rugby ball substantially opposite to that on which the apparatus is attached. Thus the weight added by the apparatus of the invention can be balanced.

The weight balancing arrangement may comprise a counterweight. The counterweight may be located on a side of the rugby ball directly opposite to that on which the apparatus is attached. When playing rugby, players often prefer to kick the ball on the seam on the opposite side of the ball from the valve. This is because the seam presents a softer part of the ball for kicking thus the power transfer can be greater. Additionally, the valve carries the most weight so by kicking this part, the weight offset is pointing in the direction of travel of the ball. Thus the ball is more likely to travel straight.

The outer cover may comprise four panels and wherein the apparatus is fixably attached to the outer cover at a seam between two of the panels and wherein the counterweight is fixably attached to the outer cover at a seam between the other two of the panels. Thus, the seam of the rugby ball can be received in the first elongate groove on the apparatus. Therefore, the apparatus does not cause the seam to protrude from the surface of the ball.

The weight balancing arrangement may comprise at least two counterweights, wherein the at least two counterweights are located on a side of the rugby ball opposite to that on which the apparatus is attached.

The at least two counterweights may be located substantially symmetrically when the ball is viewed along the longitudinal axis. For example, the counterweights may not be located on the seam but may instead be located either side of the seam. Therefore, the location of the counterweights either side of the seam means that the players are less likely to actually kick the weights themselves which would alter the movement of the ball. Therefore, the weight balancing system does not alter the move or feel of the ball when it is kicked.

The counterweights may be attached to the inside of the inflatable bladder.

The weight balancing arrangement may comprise a portion of increased wall thickness of the inner inflatable bladder, wherein the portion of increased wall thickness extends on a portion of a side of the rugby ball opposite to that on which the apparatus is attached. Thus the added weight is spread over a larger surface of the ball.

The outer cover may comprise a first aperture for aligning with the valve aperture of the apparatus and a second aperture for aligning with an electrical connection port for data transmissions and/or for charging the battery.

The electrical connection port may comprise a sealing arrangement for preventing the ingress of materials into the port. For example, the sealing arrangement may be in the form of a plug which is inserted into the electrical connection port and which prevents the ingress of materials.

Therefore, the circuit board and battery are prevented from being damaged by water or any solid substances.

The rugby ball may comprise an enlarged aperture for providing access to the valve aperture and the electrical connection port. In this way, a single hole is provided for both the valve and the electrical connection port. Thus, it is less likely that the hole will obstruct the use of the ball. Furthermore, having a single hole limits the risk of substances such as water entering the ball and damaging the circuit board or battery.

The apparatus may have a first weight and the weight balancing arrangement may have a second weight. The difference between the first weight and the second weight may be between approximately 30 grams and approximately 40 grams. This ensures the optimum weight offset for achieving the desired flight characteristics of a rugby ball.

Viewed from a third aspect there is provided a ball tracking arrangement comprising a ball or apparatus as previously defined and a plurality of receivers arranged in use to receive a signal from the apparatus, further comprising a data processor arranged to process the received signal with reference to a datum and to output data indicating the position of the apparatus.

The data processor may be arranged to receive the signal intermittently over time and to determine and output one or more of the location, speed or direction of the ball. Thus the location and movement of the ball during a game or practice can be tracked and the information used for player feedback and training.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

Figure 1:
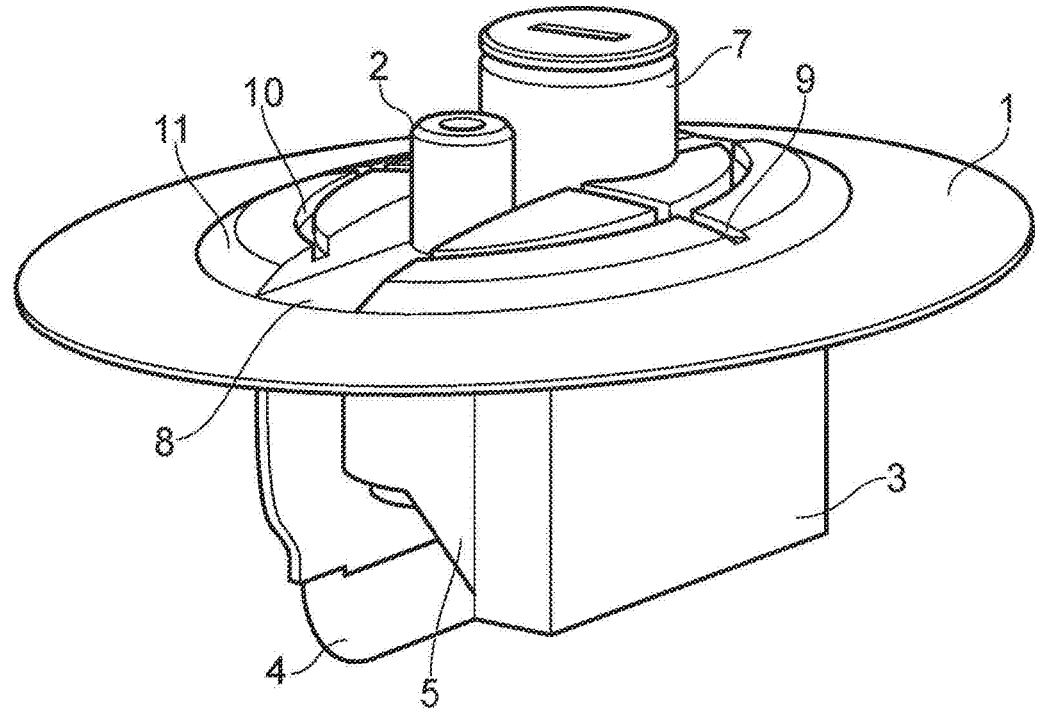
FIG. 1 shows a perspective view of the top of the apparatus of the present invention.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

As used in this specification, the words "comprises", "comprising", and similar words, are not to be interpreted in an exclusive or exhaustive sense. In other words, they are intended to mean "including, but not limited to".

It will be recognised that the features of the above-described examples of the disclosure can conveniently and interchangeably be used in any suitable combination. It will also be recognised that the invention covers not only individual embodiments but also combinations of the embodiments that have been discussed herein.

DETAILED DESCRIPTION

The present teaching relates generally to an apparatus for insertion into a sports ball.

In the present example, the sports ball is a rugby ball. In other examples, the sports ball may be a football, netball or other inflatable ball.

FIG. 1 shows a perspective view of the top of the apparatus of the invention. The apparatus comprises a plate 1 with a valve 2. The apparatus additionally comprises a battery 3, a circuit board 4 connected to the battery (connection not shown in this figure) and a connecting piece 5 for connecting the battery 3 and the circuit board 4. In the present example, the apparatus comprises an electrical connection port 7 formed within the connecting piece 5. The electrical connection port 7 is usable to charge the battery 3 and for providing data transmissions to the circuit board.

In the present example, the plate 1 comprises an extruded portion 11 which extends from the surface of the plate 1. A first elongate groove 8 extends along the length of the extruded portion 11. In the present example, the depth of the groove is such that it extends to the surface of the plate 1. This can be seen later in FIG. 3b.

The plate 1 of the present invention additionally comprises a second elongate groove 9 extending substantially perpendicularly to the first elongate groove 8 along a portion of the width of the extruded portion 11. A third groove 10 may also be incorporated into the extruded portion. The third groove 10 may be substantially oval shaped and follow the shape of the extruded portion 11. These grooves are discussed further with respect to FIG. 3.

Figure 2:
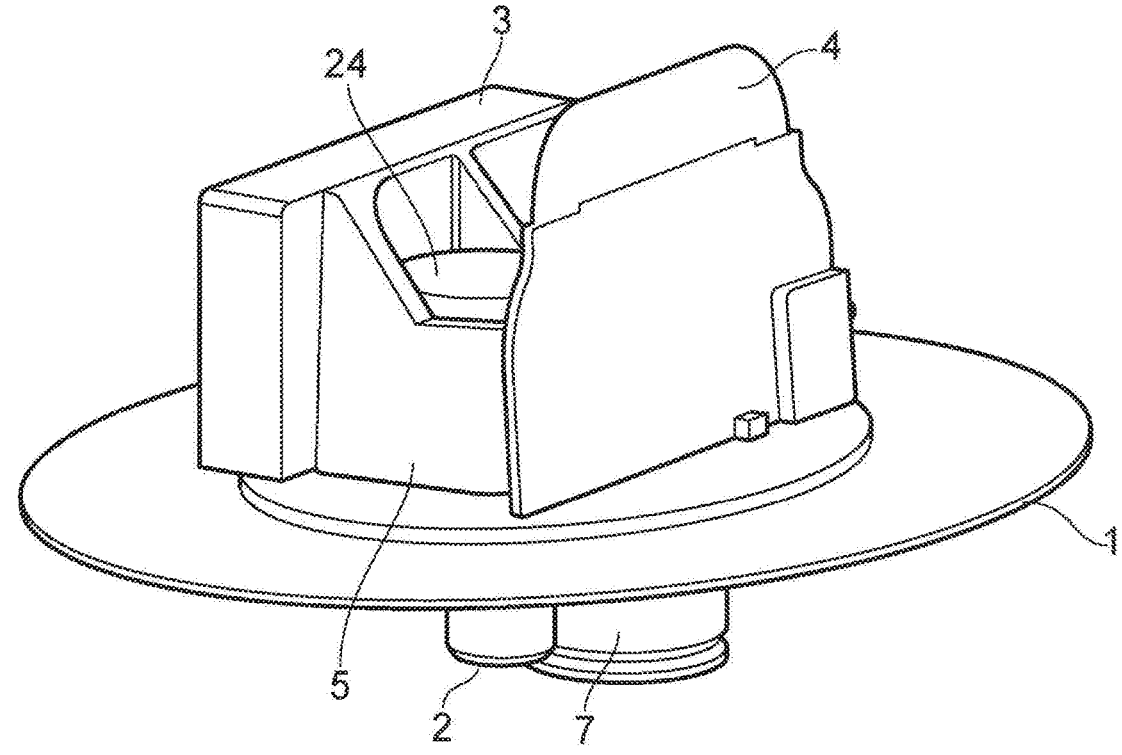
FIG. 2 shows a perspective view of the bottom of the apparatus of the present invention.

FIG. 2 shows a perspective view of the bottom of the apparatus of the invention. The connecting piece 5 may be attached to the flattened lower surface (i.e. the opposite surface to that on which the extruded portion 11 is formed) of the plate 1 by glue. The battery 3 and the circuit board 4 are located on either side of the connecting piece 5 in order to balance the weight of the apparatus. Furthermore, this provides the maximum surface area for adhesion between the connecting piece 5 and the battery 3/circuit board 4. As can be seen from FIG. 2, a lip 24 of the valve extends outside the connecting piece 5. This is discussed further later with respect to the other figures.

Inflatable balls such as rugby balls comprise an inner, inflatable bladder and an outer cover covering the bladder. When the apparatus is installed in a ball, for example a rugby ball, the lower surface of the plate shown in FIG. 2 is fixably attached to an outer surface of the bladder. For example, the plate may be attached to the outer surface of the bladder with adhesive. The battery 3, the circuit board 4 and the connecting piece 5 which extend from the lower surface of the plate 1 protrude into an internal area of the bladder through a hole in the surface of the bladder. Thus, when the bladder is inflated via the valve, the air which enters into the valve exits into the internal space inside the bladder.

Figure 3A:
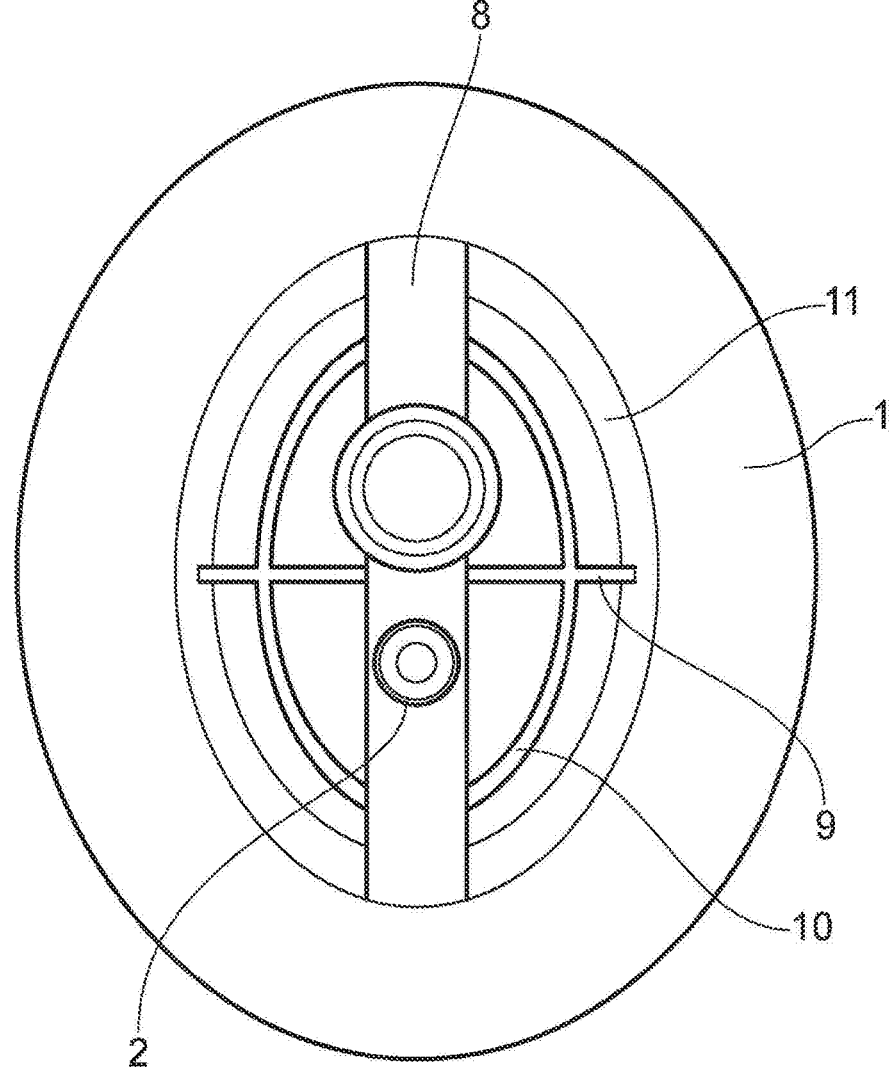
FIG. 3a shows a top view of the apparatus of the present invention.

FIG. 3a shows a top view of the apparatus of the present invention. As can be seen from this figure, the plate 1 has a substantially oval shape. In other examples, the plate 1 may have a circular or other shape.

In the present example, the extruded portion 11 has substantially the same shape as the plate 1 and is located in the centre of the plate 1.

The plate is sized in order to prevent air escaping from the bladder when the plate is attached to the bladder and the battery 3, the circuit board 4 and the connecting piece 5 into the internal space defined by the bladder. For example, the plate may be approximately 90 mm in length and 73 mm in width. The extruded portion may be approximately 62.5 mm in length and 45 mm in width. The second elongate groove 9 extends across substantially the entire width of the extruded portion 11.

The grooves 8, 9 and 10 reduce the weight of the apparatus as well as improving the flexibility of the apparatus. This is important for when the apparatus is installed in an inflatable ball as the plate is able to deform when forces are exerted on the ball (for example when the ball is kicked). Furthermore, the extruded portion 11 increases the strength of the apparatus near the more delicate parts within the ball such as the circuit board.

Figure 3B:
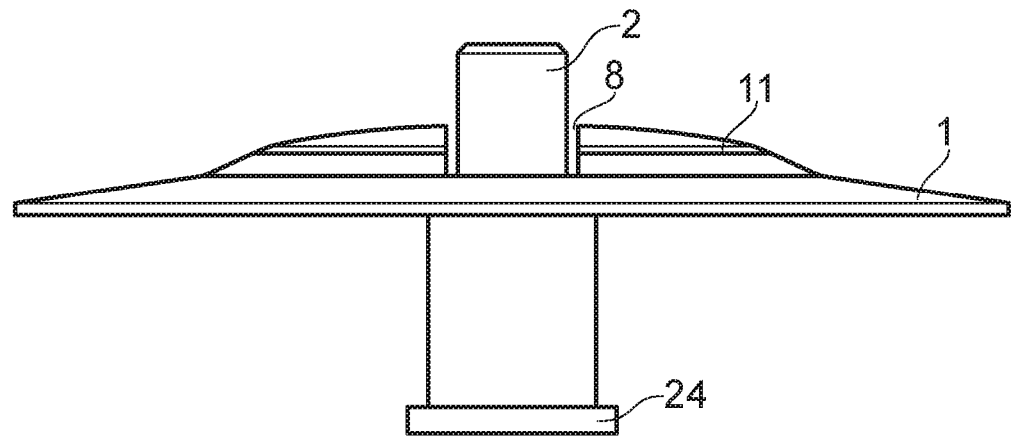
FIGS. 3b and 3c show an end view and a side view respectively of the plate and valve of the present invention.
Figure 3C:
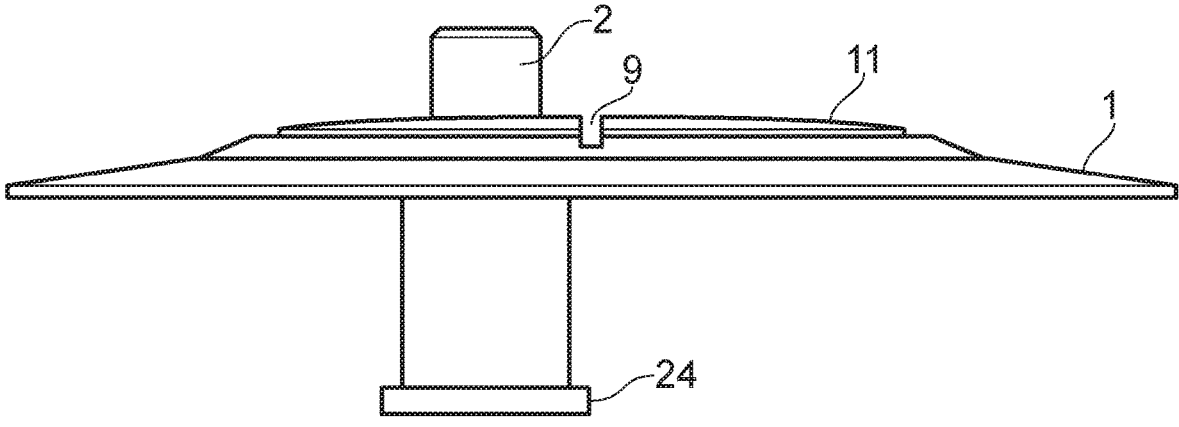

FIGS. 3b and 3c show the plate 1 and valve 2 in cross section. FIG. 3b shows the valve located in the first elongate groove 8 and FIG. 3c shows a cross sectional view of the second elongate grove 9 formed in the extruded portion 11. A cross-sectional view of the lip 24 of the valve 2 can also be seen from these figures. The lip 24 in the present example has a greater cross-sectional area than the rest of the valve. The lip 24 of the valve 2 comprises a slit (not shown). This is to allow air to be forced into the ball when the apparatus is installed in a ball and the ball is being pumped up.

As can be seen from the cross sectional views of FIGS. 3b and 3c, the plate of the present example has a curved profile when viewed in cross section. Thus, in this way when the apparatus is installed in a ball and the ball is inflated, the plate substantially aligns with the curved surface of the ball and does not alter the shape of or protrude from the curved surface of the ball.

In the present example, the plate is made of rubber. In other examples, different materials may be used.

Figure 4:
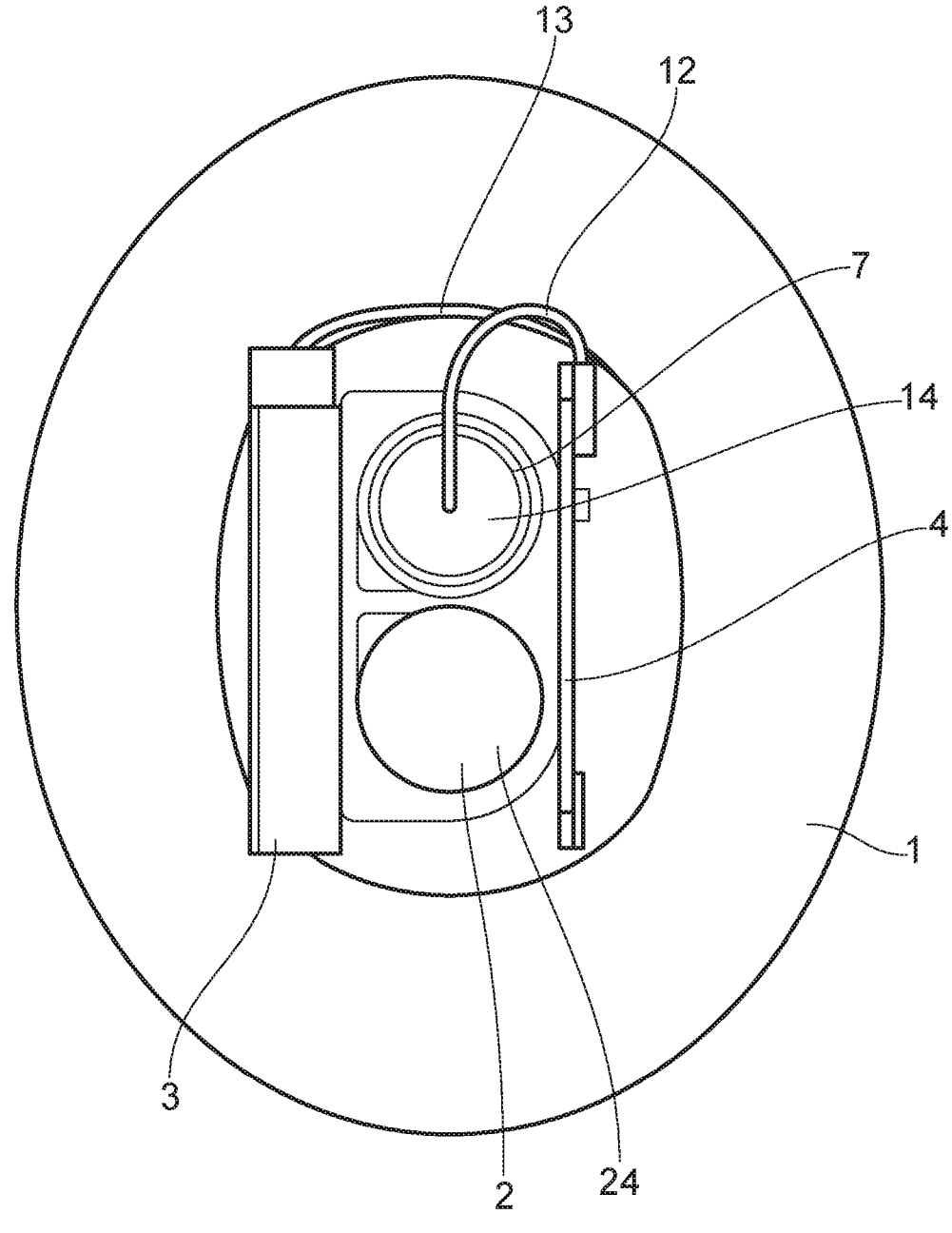
FIG. 4 shows a bottom view of the apparatus of the present invention.

FIG. 4 shows a bottom view of the apparatus. A jack 14 sits within the electrical connection port 7. Attached to the jack 14 is an end of a first wire 12. The other end of the wire 12 is attached to the circuit board 4. A second wire 13 has a first end attached to the battery 3 and a second end also attached to the circuit board 4. As a result of the wire connections 12, 13 between the electrical connection port 7, battery 3 and circuit board 4, power can be provided from the port (when connected to a power source) to charge the battery 3 and to provide software updates to the circuit board 4.

Figure 5A:
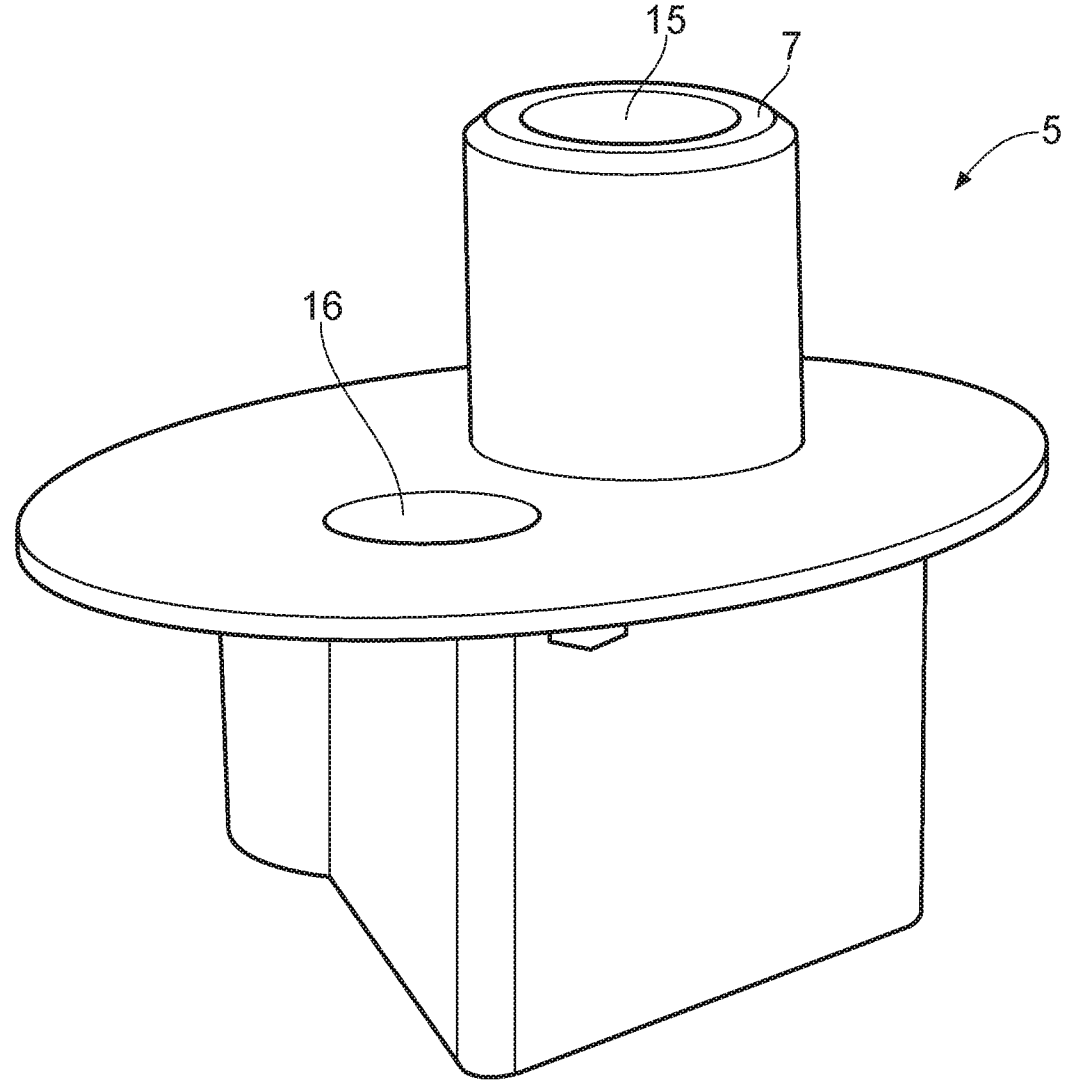
FIG. 5a shows a perspective view of the top of the connecting piece of the present invention.
Figure 5B:
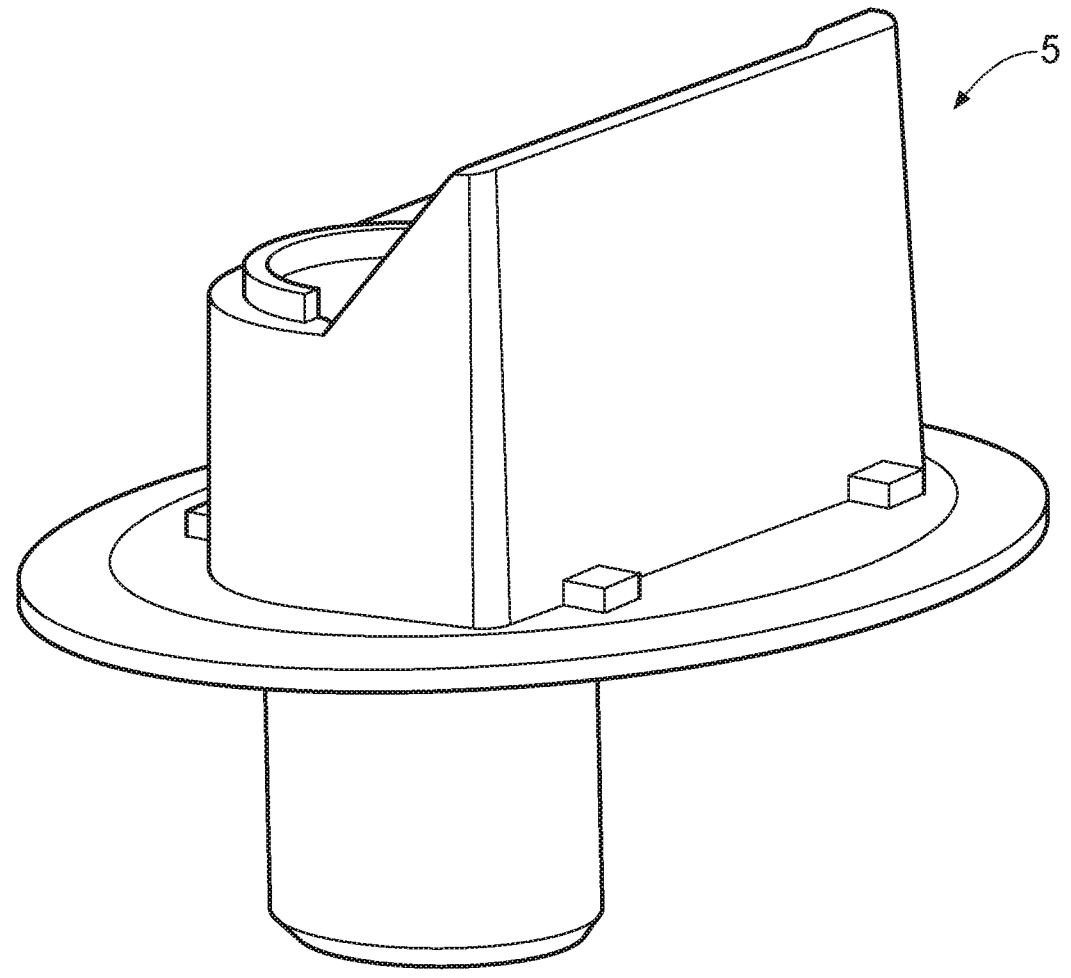
FIG. 5b shows a perspective view of the bottom of the connecting piece of the present invention.

FIGS. 5a and 5b show the perspective views of the top and bottom of the connecting piece 5 respectively. As can be seen from FIG. 5a, the connecting piece has two through holes 15, 16 in its upper surface. One of the through holes 15 is extruded from the upper surface of the connecting piece to form the electrical connection port 7. The second through hole 16 is configured for receiving the valve 2 which forms part of the plate 1.

As can be seen from FIG. 5b, the connecting piece 5 is asymmetrical in that it has one side longer than the other. The longer side provides the maximum adhesion surface for the battery 3 on the connecting piece 5. The opposing side on which the circuit board is attached is smaller, thus reducing the weight of the apparatus.

Figure 5C:
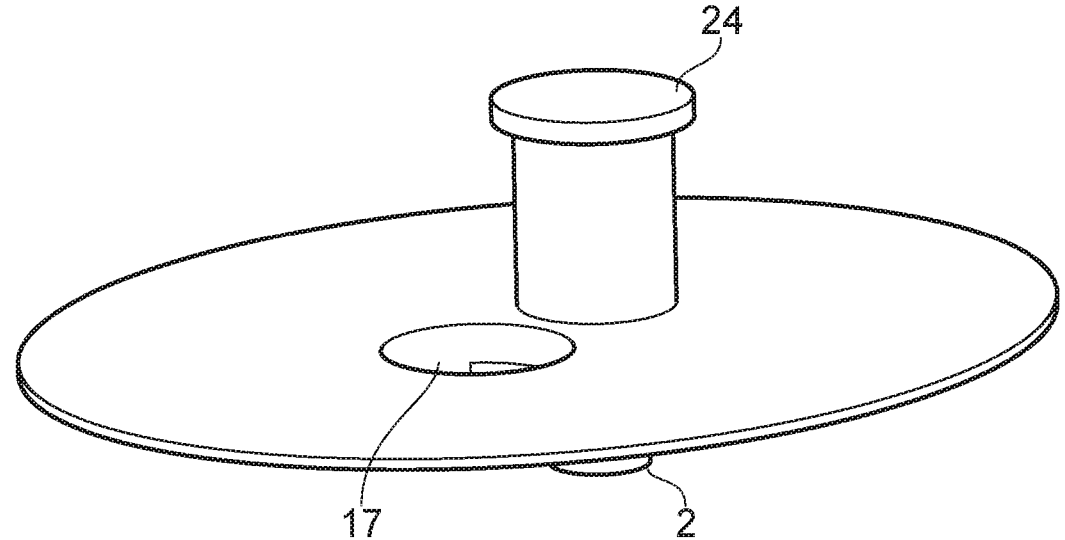
FIG. 5c shows a perspective view of the bottom of the plate and valve of the present invention.
Figure 6A:
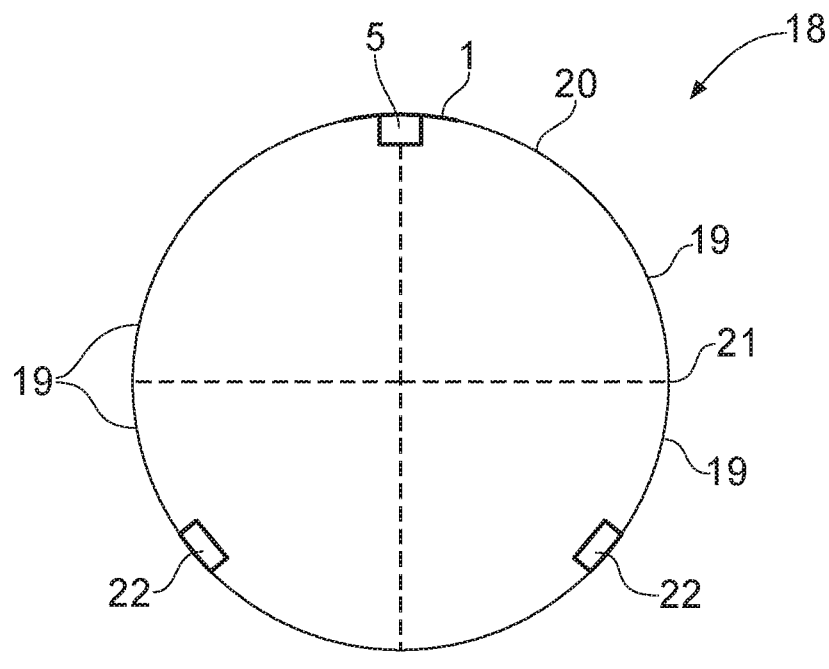
FIGS. 6a and 6b show end on and longitudinal cross-sectional views respectively of the weight balancing arrangement of the present invention installed in a rugby ball according to a first arrangement.
Figure 6B:
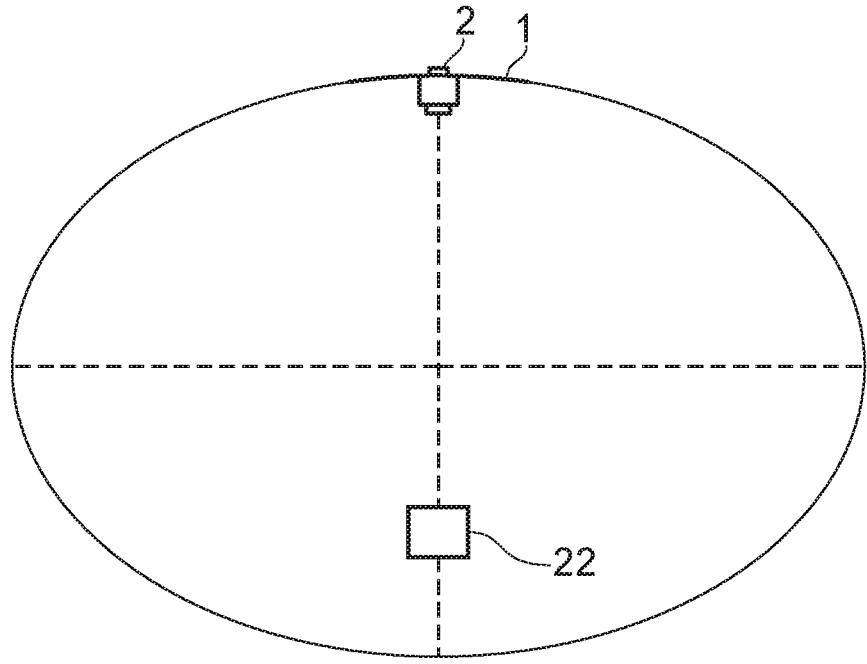

FIG. 5c shows a bottom perspective view of the plate 1 and valve 2 arrangement. As can be seen from this figure, a lower part of the valve 2 extends below the plate and ends with the lip 24. The lip 24 is formed of a flexible material such as rubber so is able to deform to fit into and through the through hole 16. When the connecting piece 5 is attached to the plate 1, the lip 24 is forced into the through hole 16 and pushed through until the lip 24 extends outside the connecting piece 5. The technician is able to know when this position has been reached since it is not possible to remove the valve 2 easily from the through hole 16 at this point as the protruding surface of the lip sits on the lower surface of the connecting piece 5. This was shown previously in FIG. 2.

The plate 1 additionally comprises a through hole 17 in its surface which is configured to receive the electrical connection port 7.

When the apparatus is installed in a ball, a weight offset is caused within the ball by the apparatus comprising the plate, circuit board and battery being attached on one side, and a weight balancing arrangement being attached on the other side of the ball. In the present example, a weight offset of between approximately 30 to 40 grams is provided. However, in different examples a different weight offset may be provided. In order to achieve this offset, the weight of the battery and additional components in combination with the plate and the valve is approximately 40 to 50 grams and the weight of the weight balancing arrangement is 10 to 20 grams.

The weight balancing arrangement may be incorporated into the ball in a number of different ways, as is shown in FIGS. 6 to 10. These figures show end on and longitudinal cross-sectional views respectively of the weight balancing arrangement installed in a rugby ball.

As is discussed above, a rugby ball 18 comprises an inner inflatable bladder and an outer cover 20. The outer cover is often made up of a plurality of panels 19, for example four. The panels 19 are connected at seams 21 where they are stitched together. In the present example, the extruded portion 11 of the plate 1 is attached to the cover by adhesive.

The apparatus of the present invention is attached in between two if the panels 19 of the outer cover 20, at a seam 21. It is located substantially halfway between the two ends of the ovoid rugby ball. The outer cover 20 is folded into the first elongate groove 8 of the plate.

FIGS. 6 to 9 show the use of additional weights in order to balance the weight in the ball. Starting with FIGS. 6a and 6b, these show the use of two additional weights 22 in the ball. These are located symmetrically when the ball is viewed end on, as in FIG. 6a.

Figure 7A:
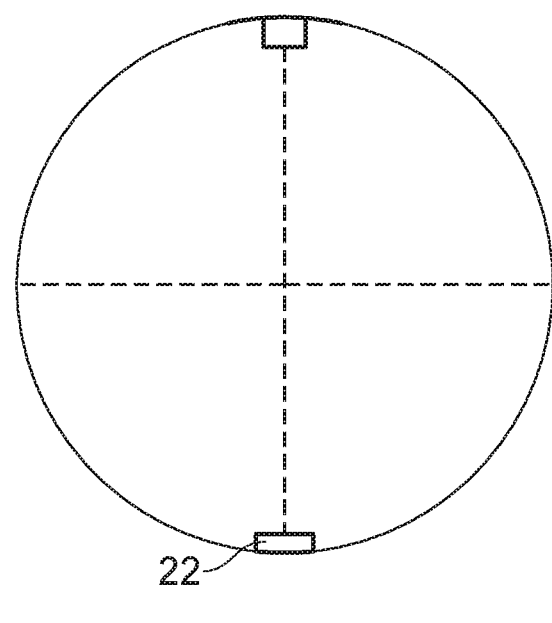
FIGS. 7a and 7b show end on and longitudinal cross-sectional views respectively of the weight balancing arrangement of the present invention installed in a rugby ball according to a second arrangement.
Figure 7B:
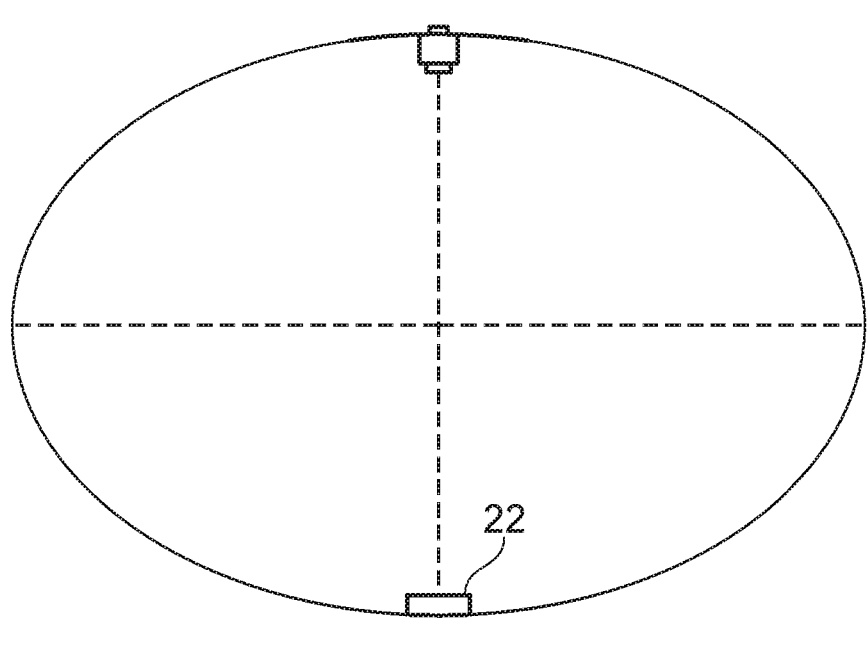

FIGS. 7a and 7b show an alternative arrangement of the weight balancing arrangement. In this arrangement, a single weight 22 is used. The weight 22 is located directly opposite the plate and valve arrangement. In the present example as is shown in FIGS. 7a and 7b, the rugby ball has four panels and the plate 1 is attached between two of the four panels, at a seam, and the weight 22 is attached between the other two of the four panels, at a seam.

Figure 8A:
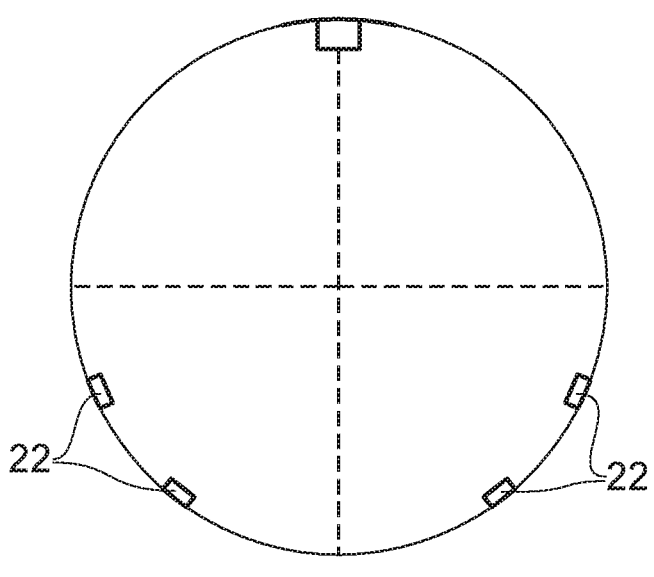
FIGS. 8a and 8b show end on and longitudinal cross-sectional views respectively of the weight balancing arrangement of the present invention installed in a rugby ball according to a third arrangement.
Figure 8B:
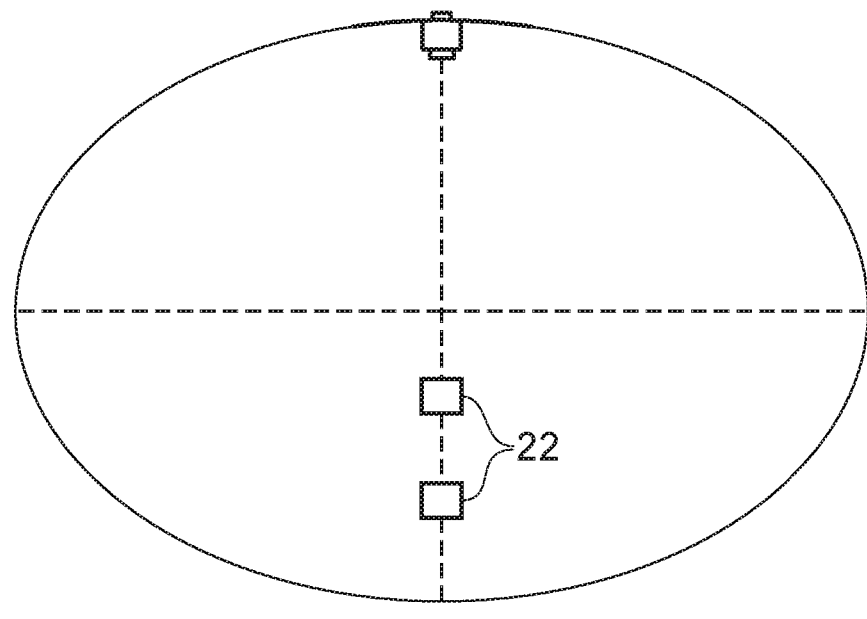

FIGS. 8a and 8b show an alternative arrangement of the weight balancing arrangement. In this arrangement, four weights 22 are used. These are located symmetrically when the ball is viewed end on, as in FIG. 8a. Furthermore, as is shown in FIG. 8b, each of the four weights is located half way between either end of the rugby ball.

Figure 9A:
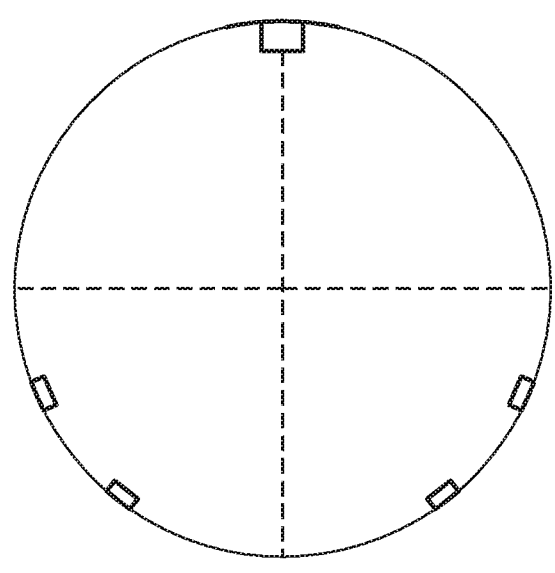
FIGS. 9a and 9b show end on and longitudinal cross-sectional views respectively of the weight balancing arrangement of the present invention installed in a rugby ball according to a fourth arrangement.
Figure 9B:
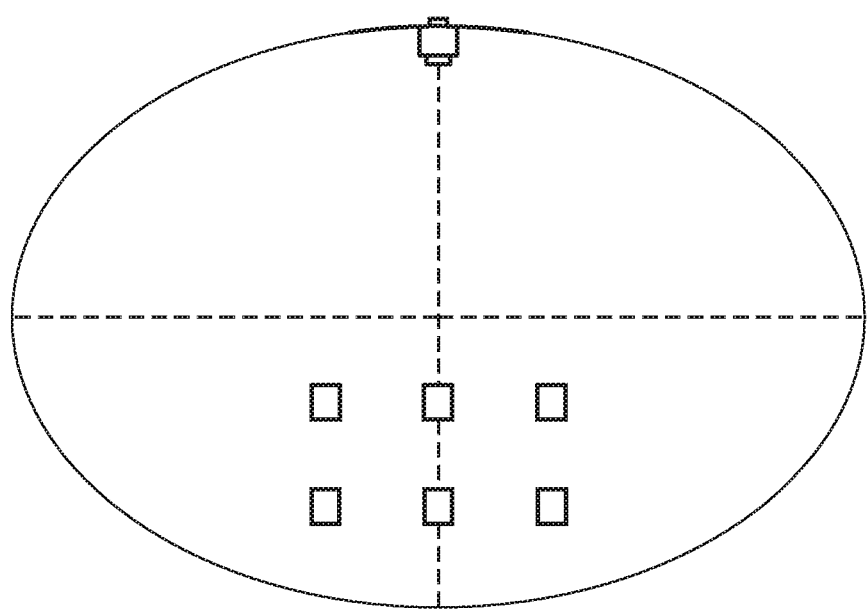

FIGS. 9a and 9b show an alternative arrangement of the weight balancing arrangement. In this arrangement, twelve weights are used. In other examples, more or fewer than twelve weights may be used. As is shown in FIG. 9a, the weights are located symmetrically when the ball is viewed end on, with six being located on either side of the seam opposite that which holds the valve. As can be seen from FIG. 9b longitudinal cross sectional view, the weights are arranged in two rows of three. In other examples, the weights may instead be arranged in a single row.

Other arrangements may be used which are not described herein and shown in the accompanying figures. For example, any arrangement of weights may be used in the ball which counterbalance the additional weight added by the battery 3 and circuit board 4.

The weights may be rectangular as is shown in the figures or may be another shape. For example, the weights may be circular or square. The weights may be made of rubber.

Figure 10A:
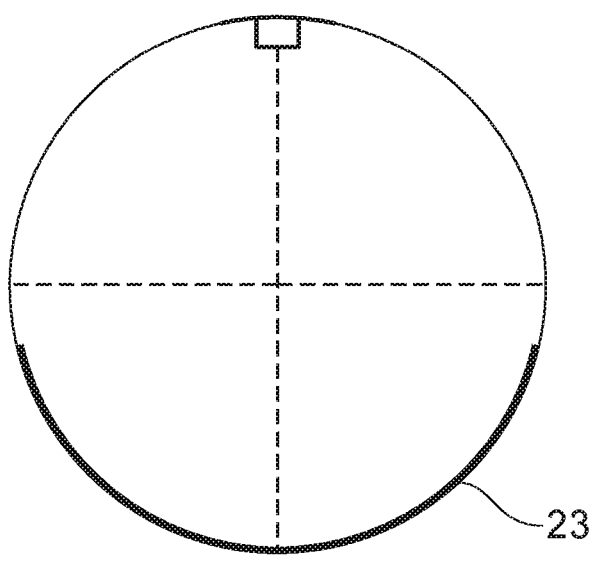
FIGS. 10a and 10b show end on and longitudinal cross-sectional views respectively of the weight balancing arrangement of the present invention installed in a rugby ball according to a fifth arrangement.
Figure 10B:
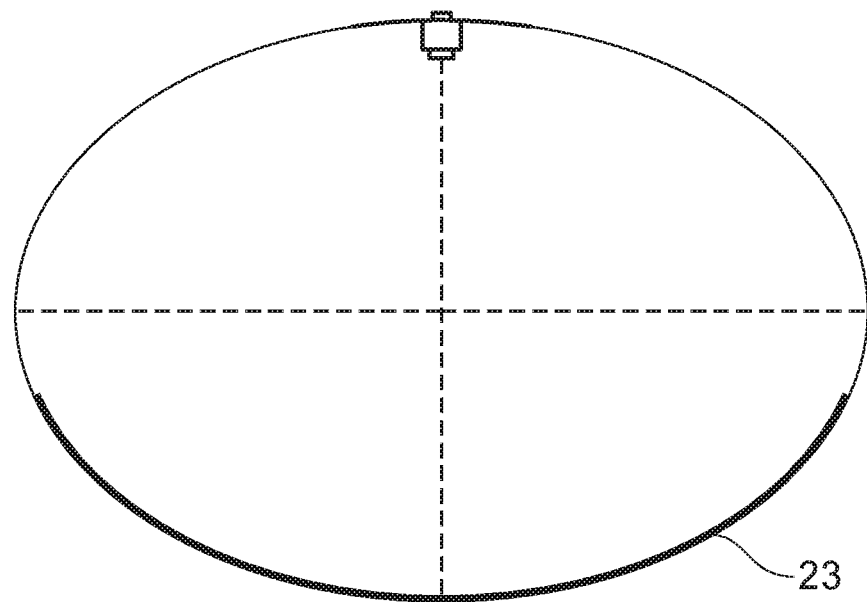

In some examples, and as is shown in FIGS. 10a and 10b, the weight balancing arrangement comprises a thickened portion 23 of the bladder wall. In the present example, and as is shown in FIGS. 10a and 10b, this extends across substantially half of the rugby ball which is opposite the plate and valve. In other examples, the thickened portion may extend across the entirety of the two panels opposite the plate and valve. Alternatively, the thickened portion may extend across less of the two panels opposite the plate and valve. In order to achieve this thicker portion, half of the bladder may be dipped into a liquid solution which dries to form the thickened wall.

In another example, the weight balancing arrangement may include the use of increased weight stitching between the panels opposite the valve/plate arrangement.

When the apparatus is installed in a rugby ball, the position of the ball can be tracked within a nominated space, for example within a training field or stadium. This is done by the circuit board 4 transmitting radio signals to various receivers. The battery powers the transmitter so that it can transmit the signals. The signal may be transmitted using ultra-wideband (UWB). This technology enables the position of the ball to be recorded accurate to between 20 and 40 cm. UWB uses very low energy thus reducing the required regularity for charging the battery.

The battery is charged by connecting the electrical connection port 7 to a power source. This also enables software updates of the circuit board to be carried out.

When the apparatus of the present invention is installed in another type of inflatable ball, for example a round ball such as a football or a netball, a more even weight balance is required. In these applications, the weight of the apparatus may be reduced and the weight balancing arrangement be designed to have a weight equal to that of the reduced weight valve.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the spirit and scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus for insertion into an inflatable sports ball, the apparatus comprising:
    a plate with a curved outer surface for contacting with an inner surface of the inflatable sports ball, the plate comprising:
        a valve, wherein the valve comprises an aperture for selective communication of air, and
        a first elongate groove formed in the curved outer surface of the plate and configured to contact the inner surface of the inflatable sports ball, the first elongate groove housing the valve;
        a second elongate groove formed in the curved outer surface of the plate and configured to contact the inner surface of the inflatable sports ball, the second elongate groove perpendicular to the first elongate groove;
        an oval shaped groove coaxial with the valve and formed in the curved outer surface of the plate;
    a circuit board comprising a transmitter, and
    a battery electrically connect to the circuit board.

2. The apparatus of claim 1, wherein the plate further comprises an electrical connection port for data transmissions and/or the supply of electric power for charging the battery.

3. The apparatus of claim 1, wherein the transmitter is ultra-wideband (UWB).

4. The apparatus of claim 1, wherein the transmitter is configured to send signals to receivers.

5. A rugby ball having a substantially ovoid shape comprising:
    an inner inflatable bladder configured to be inflated through a valve aperture;
    an outer cover configured to encase the inner inflatable bladder when inflated; and
    an apparatus attached to the outer cover, the apparatus comprising:
        a plate with a curved profile for contacting with an inner surface of the rugby ball, the plate comprising:
            a valve, wherein the valve comprises an aperture for selective communication of air; and
            a first elongate groove formed in the curved outer surface of the plate and configured to contact the inner surface of the inflatable sports ball, the first elongate groove housing the valve;
            a second elongate groove formed in the curved outer surface of the plate and configured to contact the inner surface of the inflatable sports ball, the second elongate groove perpendicular to the first elongate groove;
            an oval shaped groove coaxial with the valve and formed in the curved outer surface of the plate;
        a circuit board comprising a transmitter; and
        a battery electrically connected to the circuit board, wherein a portion of the apparatus extends into the inner inflatable bladder and wherein the valve aperture is in fluid communication with the interior of the inner inflatable bladder.

6. The rugby ball of claim 5, further comprising two ends located along a longitudinal axis of the rugby ball wherein the apparatus is attached to the outer cover substantially halfway between the two ends of the rugby ball.

7. The rugby ball of claim 5, wherein the outer cover comprises a plurality of panels connected together by seams, wherein the apparatus is fixably attached to the outer cover at a seam between two adjacent panels.

8. The rugby ball of claim 5, further comprising a weight balancing arrangement.

9. The rugby ball of claim 8, wherein the weight balancing arrangement comprises at least one counterweight located on a side of the rugby ball substantially opposite to that on which the apparatus is attached.

10. The rugby ball of claim 8, wherein the weight balancing arrangement comprises a counterweight, and wherein the counterweight is located on a side of the rugby ball directly opposite to that on which the apparatus is attached.

11. The rugby ball of claim 10, wherein the outer cover comprises four panels and wherein the apparatus is fixably attached to the outer cover at a seam between two of the panels and wherein the counterweight is fixably attached to the outer cover at a seam between the other two of the panels.

12. The rugby ball of claim 9, wherein the weight balancing arrangement comprises at least two counterweights, and wherein the at least two counterweights are located on a side of the rugby ball opposite to that on which the apparatus is attached.

13. The rugby ball of claim 12, wherein the at least two counterweights are located substantially symmetrically when the rugby ball is viewed along the longitudinal axis.

14. The rugby ball of claim 12, wherein the at least two counterweights are attached to the inside of the inflatable bladder.

15. The rugby ball of claim 8, wherein the weight balancing arrangement comprises a portion of increased wall thickness of the inner inflatable bladder, wherein the portion of increased wall thickness extends on a portion of a side of the rugby ball opposite to that on which the apparatus is attached.

16. The rugby ball of claim 5, wherein the outer cover comprises a first aperture for aligning with the valve aperture of the apparatus and a second aperture for aligning with an electrical connection port for data transmission and for charging the battery.

17. The rugby ball of claim 16, wherein the electrical connection port comprises a sealing arrangement for preventing the ingress of materials into the port.

18. The rugby ball of claim 16, further comprising an enlarged aperture for providing access to the valve aperture and the electrical connection port.

19. The rugby ball of claim 8, wherein the apparatus has a first weight and the weight balancing arrangement has a second weight, and wherein the difference between the first weight and the second weight is between approximately 30 grams and approximately 40 grams.

20. A ball tracking arrangement comprising:
an inflatable sports ball comprising an apparatus, the apparatus comprising:
  a plate with a curved profile for contacting with an inner surface of the inflatable sports ball, the plate comprising:
    a valve, wherein the valve comprises an aperture for selective communication of air; and
    a first elongate groove formed in the curved outer surface of the plate and configured to contact the inner surface of the inflatable sports ball, the first elongate groove housing the valve;
    a second elongate groove formed in the curved outer surface of the plate and configured to contact the inner surface of the inflatable sports ball, the second elongate groove perpendicular to the first elongate groove;
    an oval shaped groove coaxial with the valve and formed in the curved outer surface of the plate;
    a circuit board comprising a transmitter; and
    a battery electrically connected to the circuit board;
  a plurality of receivers arranged in use to receive a signal from the transmitter; and
  a data processor arranged to process the received signal with reference to a datum and to output data indicating the position of the apparatus.

21. The ball tracking arrangement of claim 20, wherein the data processor is arranged to receive the signal intermittently over time and to determine and output one or more of the location, speed or direction of the ball or the apparatus.

* * * * *